(12) United States Patent
Li et al.

(10) Patent No.: US 10,346,664 B2
(45) Date of Patent: Jul. 9, 2019

(54) FINGERPRINT DETECTION CIRCUIT AND ELECTRONIC DEVICE

(71) Applicant: BYD COMPANY LIMITED, Shenzhen (CN)

(72) Inventors: Zhengang Li, Shenzhen (CN); Kunping Xu, Shenzhen (CN); Yun Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 82 days.

(21) Appl. No.: 15/546,754

(22) PCT Filed: Jan. 5, 2016

(86) PCT No.: PCT/CN2016/070190
§ 371 (c)(1),
(2) Date: Jul. 27, 2017

(87) PCT Pub. No.: WO2016/127733
PCT Pub. Date: Aug. 18, 2016

(65) Prior Publication Data
US 2018/0005000 A1 Jan. 4, 2018

(30) Foreign Application Priority Data
Feb. 13, 2015 (CN) .......................... 2015 1 0082222

(51) Int. Cl.
*G06K 9/00* (2006.01)
(52) U.S. Cl.
CPC ........... *G06K 9/0002* (2013.01); *G06K 9/001* (2013.01)
(58) Field of Classification Search
CPC .............................. G06K 9/0002; G06K 9/001
See application file for complete search history.

(56) References Cited

U.S. PATENT DOCUMENTS 5,210,588 A * 5/1993 Lee ...................... A61B 5/1172
356/71
5,633,594 A 5/1997 Okada
(Continued)

FOREIGN PATENT DOCUMENTS

| CN | 1576799 A | 2/2005 |
|---|---|---|
| CN | 1576862 A | 2/2005 |

(Continued)

OTHER PUBLICATIONS

The World Intellectual Property Organization (WIPO) International Search Report and Written Opinion for PCT/CN2016/070190 dated Apr. 8, 2016 6 Pages.

*Primary Examiner* — John B Strege
(74) *Attorney, Agent, or Firm* — Anova Law Group, PLLC

(57) ABSTRACT

A fingerprint detection circuit and an electronic device are provided. The fingerprint detection circuit is configured to apply an excitation signal to a finger so as to generate finger capacitors, and the fingerprint detection circuit includes: a signal amplifier having a negative input terminal connected with one of the finger capacitors, a positive input terminal connected with a ground terminal, and an output terminal to output an output voltage according to a capacitance value of the one of the finger capacitors; a capacitor connected between the negative terminal and the output terminal of the signal amplifier; a rheostat; and a switch unit connected with the rheostat in series and configured to control the rheostat to be connected with the capacitor in parallel, such that the output voltage has a non-linear relationship with the capacitance value of the one of the finger capacitors.

7 Claims, 3 Drawing Sheets

(56) References Cited

U.S. PATENT DOCUMENTS

| | | |
|---|---|---|
| 6,980,008 B2 | 12/2005 | Teranuma et al. |
| 2003/0016024 A1 | 1/2003 | Teranuma et al. |
| 2005/0024065 A1 | 2/2005 | Umeda et al. |
| 2008/0069413 A1 | 3/2008 | Riedijk et al. |
| 2012/0085822 A1 | 4/2012 | Setlak et al. |
| 2012/0090757 A1 | 4/2012 | Buchan et al. |
| 2014/0021966 A1 | 1/2014 | Shahrokhi et al. |
| 2014/0103941 A1 | 4/2014 | Chou et al. |
| 2014/0140588 A1 | 5/2014 | Chou |
| 2015/0233989 A1 | 8/2015 | Chou |
| 2016/0042216 A1* | 2/2016 | Yang ............... G06K 9/0002 382/124 |
| 2016/0379032 A1* | 12/2016 | Mo ................. G06K 9/0002 382/124 |

FOREIGN PATENT DOCUMENTS

| | | |
|---|---|---|
| CN | 101526988 A | 9/2009 |
| CN | 101526990 A | 9/2009 |
| CN | 203102316 U | 7/2013 |
| CN | 103294297 A | 9/2013 |
| CN | 103440474 A | 12/2013 |
| CN | 103729615 A | 4/2014 |
| CN | 103729617 A | 4/2014 |
| CN | 103729633 A | 4/2014 |
| CN | 103791928 A | 5/2014 |
| CN | 103870817 A | 6/2014 |
| CN | 203689535 U | 7/2014 |
| CN | 203799390 U | 8/2014 |
| CN | 104155785 A | 11/2014 |
| CN | 203964928 U | 11/2014 |
| CN | 104217193 A | 12/2014 |
| CN | 104748770 A | 7/2015 |
| EP | 1503324 A1 | 2/2005 |
| EP | 1766547 A1 | 3/2007 |
| JP | H05175466 A | 7/1993 |
| JP | 2003050994 A | 2/2003 |
| JP | 2003090703 A | 3/2003 |
| JP | 2005049107 A | 2/2005 |
| JP | 2008502989 A | 1/2008 |
| JP | 2010117354 A | 5/2010 |
| JP | 2012513274 A | 6/2012 |
| JP | 2013541780 A | 11/2013 |
| KR | 20050007131 A | 1/2005 |
| KR | 20050013960 A | 2/2005 |
| KR | 20140140113 A | 12/2014 |
| TW | 201015452 A | 4/2010 |
| TW | 201209852 A | 3/2012 |
| TW | 201232362 A | 8/2012 |
| TW | 201337782 A | 9/2013 |
| TW | 201414987 A | 4/2014 |
| TW | 201439843 A | 10/2014 |
| TW | 201439865 A | 10/2014 |
| WO | 2005124659 A1 | 12/2005 |
| WO | 2014056313 A1 | 4/2014 |
| WO | 2015096807 A1 | 7/2015 |

* cited by examiner

FINGERPRINT DETECTION CIRCUIT AND ELECTRONIC DEVICE

CROSS REFERENCE TO RELATED APPLICATION

This application is a national phase entry under 35 U.S.C, § 371 of International Application No. PCT/CN2016/070190, filed on Jan. 5, 2016, which claims priority and benefits of Chinese Patent Application No, 201510082222.7, filed with State Intellectual. Property Office, P. R. C. on Feb. 13, 2015, the entire content of which is incorporated herein by reference

FIELD

The present disclosure relates to a fingerprint detection technology field and, more particularly, to a fingerprint detection circuit and an electronic device.

BACKGROUND

In the related art, since a capacitive fingerprint detection circuit in a chip has advantages of small size and low power consumption, this kind of the fingerprint detection circuit is more preferred in the mobile phone and tablet market Such fingerprint detection circuit detects fingerprint ridge information and fingerprint valley information. Since the distance between the fingerprint ridge and a sensing unit of the fingerprint detection unit is relatively small, and the distance between the fingerprint valley and the sensing unit of the fingerprint detection unit is relatively large, there is a difference between a ridge capacitance generated between the fingerprint ridge ridge the sensing unit and a valley capacitance generated between the fingerprint valley and the sensing unit. Once the ridge capacitance and the valley capacitance (referred to finger capacitance hereinafter) are detected, ridge characteristics and valley characteristics of the finger may be analyzed.

An output voltage output from the above fingerprint detection circuit has a proportional linear relationship with the finger capacitance (capacitance to be tested). A final result has a small difference between an output voltage corresponding to the finger capacitance of the ridge and an output voltage corresponding to the finger capacitance of the valley, so that it needs to amplify an output voltage corresponding to the finger capacitance by a predetermined factor for processing. However, the amplified factor can be limited by a range, if the amplified factor is too large, the output voltage will exceed the range to cause the data to overflow, if the amplified factor is too small, and the calculated difference between the output voltage corresponding to the finger capacitance of the ridge and the output voltage corresponding to the finger capacitance of the valley is too small, which is too difficult to identify, and the finger detection result cannot be optimized.

SUMMARY

Embodiments of the present disclosure seek to solve at least one of the problems existing in the related art to at least some extent.

The present disclosure provides a fingerprint detection circuit and an electronic device.

According to embodiments of a first aspect of the present disclosure, a fingerprint detection circuit is provided. The fingerprint detection circuit is configured to apply an excitation signal to a finger so as to generate finger capacitors, and the fingerprint detection circuit includes: a signal amplifier having a negative input terminal connected with one of the finger capacitors, a positive input terminal connected with a ground terminal, and an output terminal to output an output voltage according to a capacitance value of the one of the finger capacitors; a capacitor connected between the negative terminal and the output terminal of the signal amplifier; a rheostat; and a switch unit connected with the rheostat in series, and configured to control the rheostat to be connected with the capacitor in parallel, such that the output voltage has a non-linear relationship with the capacitance value of the one of the finger capacitors.

With the fingerprint detection circuit according to embodiments of the present disclosure, the output voltage of the signal amplifier has a non-linear relationship with the capacitance value of one of the finger capacitors, in the subsequent process, the output voltage of the signal amplifier can be amplified in a locally linear way, such that the difference between the voltage corresponding to the ridge capacitor and the voltage corresponding to the valley capacitor becomes relatively large, and the signal to noise ratio is higher, which is more easily for subsequent algorithms to recognize, thus improving the effect of the fingerprint detection.

According to embodiments of a second aspect of the present disclosure, an electronic device is provided, and the electronic device includes the fingerprint detection circuit according to embodiments of the first aspect of the present disclosure.

With the electronic device according to embodiments of the present disclosure, the output voltage of the signal amplifier has a non-linear relationship with the capacitance value of one of the finger capacitors, in the subsequent process, the output voltage of the signal amplifier can be amplified in a locally linear way, such that the difference between the voltage corresponding to the ridge capacitor and the voltage corresponding to the valley capacitor becomes relatively large, and the signal to noise ratio is higher, which is more easily for subsequent algorithms to recognize, thus improving the effect of the fingerprint detection.

The aspects and advantages of the present disclosure will be presented in following descriptions, and part of which will become obvious in view of following descriptions, or be learned by practice of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
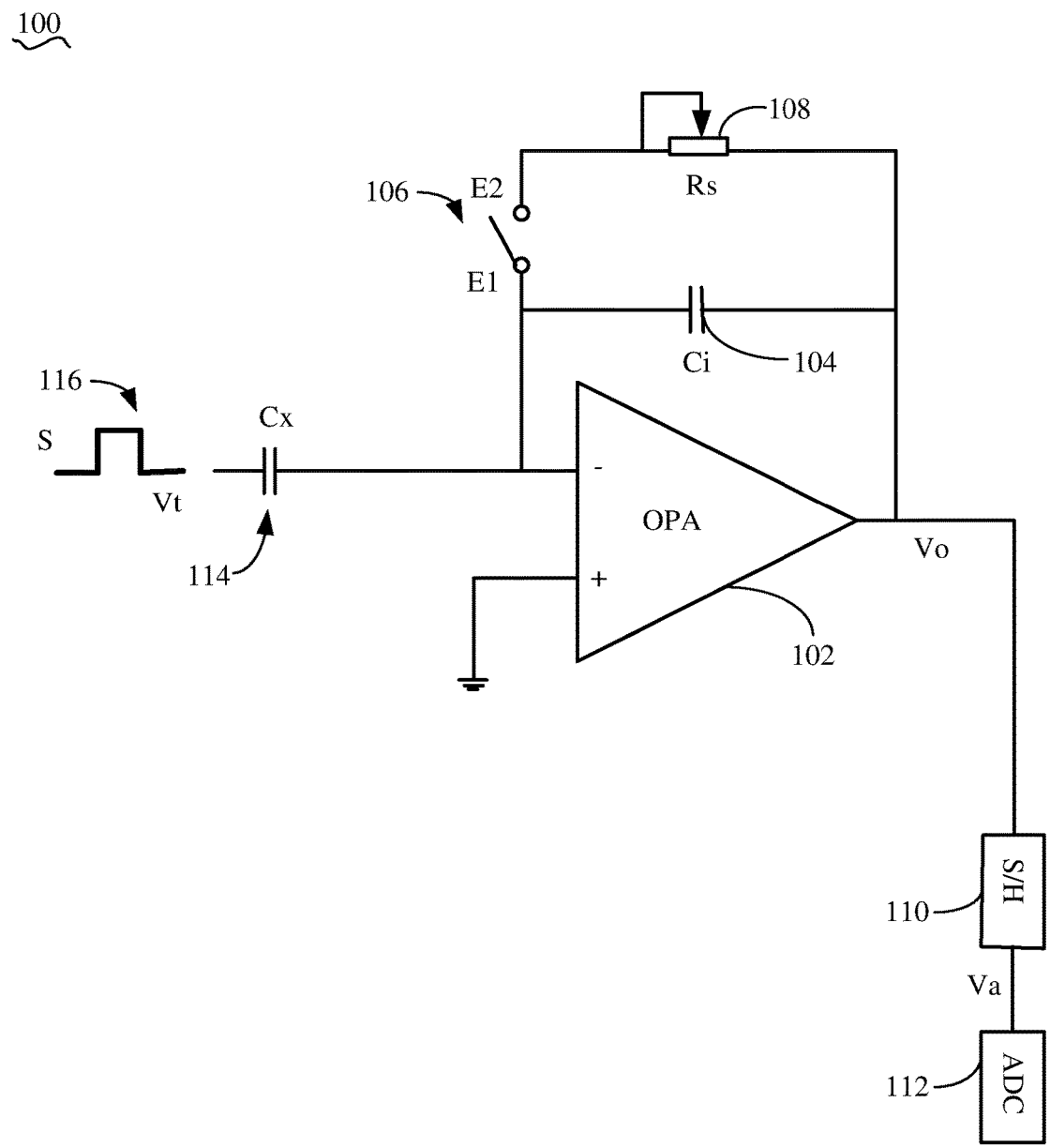
FIG. 1 is a schematic diagram of a fingerprint detection circuit according to an embodiment of the present disclosure.

Exemplary embodiments will be described in detail herein, and examples thereof are illustrated in accompanying drawings. Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description of the present disclosure, it should be understood that, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

In the following, a fingerprint detection circuit, and an electronic device are described in detail with reference to drawings.

FIG. 1 is a schematic diagram of a fingerprint detection circuit according to an embodiment of the present disclosure. As shown in FIG. 1, the fingerprint detection circuit 100 includes a signal amplifier 102, a capacitor 104, a switch unit 106, a rheostat 108, a sampling hold circuit 110, and an analog-to-digital converter 112.

Figure 2:
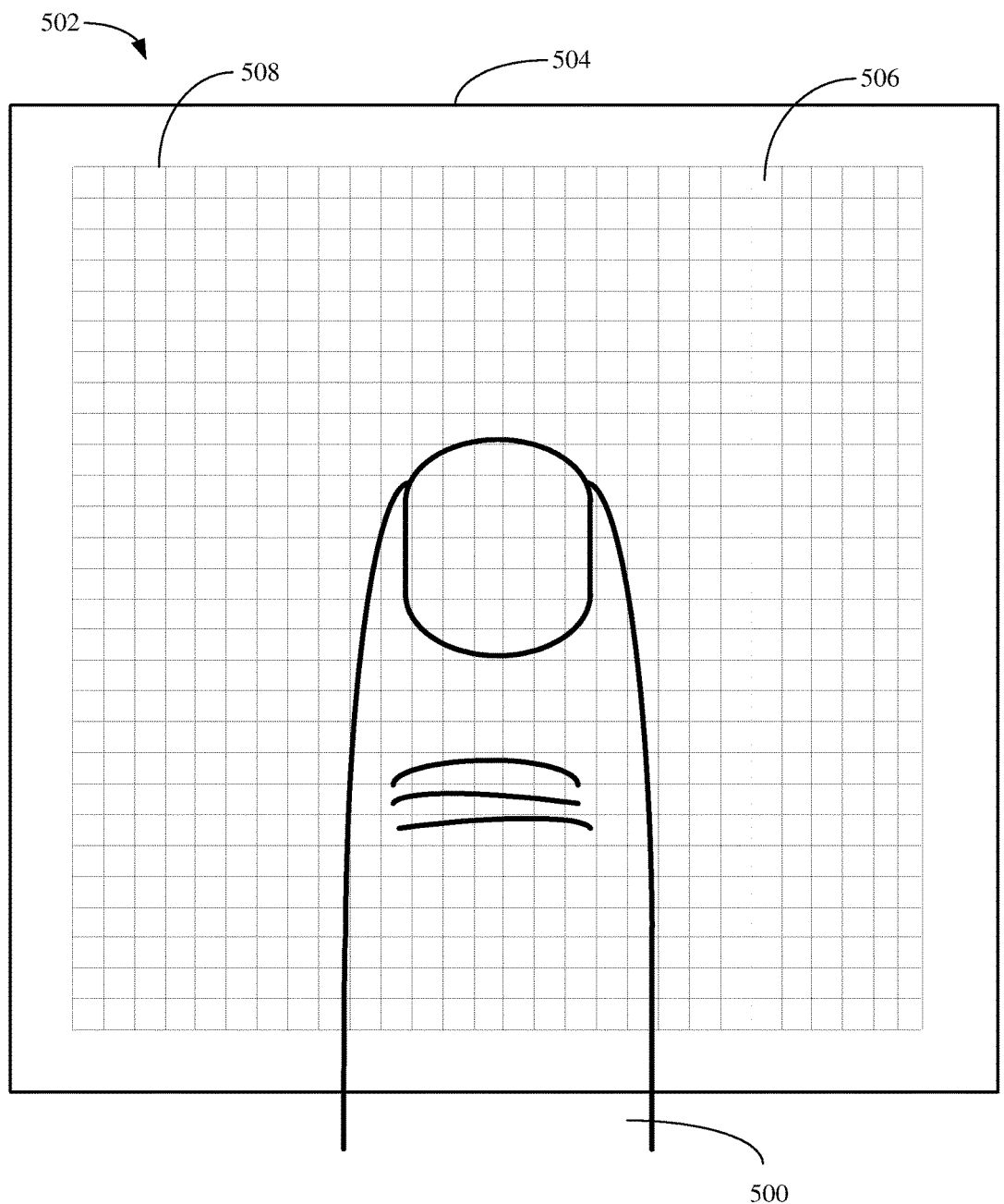
FIG. 2 is a schematic diagram illustrating a fingerprint collecting performed by the fingerprint detection circuit according to an embodiment of the present disclosure.

As shown in FIG. 2, when the fingerprint detection circuit 100 collects fingerprints, the fingerprint detection circuit 100 may apply an excitation signal to a finger 500 so as to generate finger capacitors 114. For example, the fingerprint detection circuit 100 may output the excitation signal via a signal generator 16, and transmit the excitation signal to the finger 500 via an emission electrode (not shown). The excitation signal may be an alternating signal, such as a sinewave signal, a square wave signal, or a triangular wave signal. The voltage magnitude of the alternating signal (referred to excitation voltage hereinafter) is Vt, and the frequency of the alternating signal is S.

The finger capacitors 114 are generated between a fingerprint of the finger 500 and a fingerprint sensor 502. For example, the ridge capacitors are generated between a fingerprint ridge of the finger 500 and the fingerprint sensor 502, and the valley capacitors are generated between a fingerprint valley of the finger 500 and the fingerprint sensor 502. Each of the ridge capacitors and the valley capacitors can be referred to as the finger capacitor 114, which is a capacitor to be measured.

For example, as shown in FIG. 2, the fingerprint sensor 502 includes a frame 504 and a two-dimensional detecting array 508 including a plurality of fingerprint sensing units 506.

The frame 504 is arranged around the two-dimensional detecting array 508, and provides the excitation signal (such as the alternating signal) when the fingerprint detecting is performed. For example, the frame 504 may be connected with the emission electrode for outputting the excitation signal.

Each fingerprint sensing unit 506 is configured to collect a single pixel of a fingerprint image. For example, each fingerprint sensing unit 506 usually has a size of about 50 um*50 um. A capacitance value of one of the finger capacitors 114 generated between the fingerprint sensing unit 506 and the finger 500 is a ridge characteristic or a valley characteristic of the fingerprint. Therefore, by detecting the capacitance values of a plurality of finger capacitors 114, each of which is generated between one fingerprint sensing unit 506 and the finger 500, the ridge and valley characteristics of the fingerprint image can be analyzed according to the plurality of finger capacitors 114.

In an embodiment, as shown in FIG. 1, the signal amplifier 102 is corresponding to each fingerprint sensing unit 506 and outputs the output voltage corresponding to the linger capacitor 114. The negative input terminal of the signal amplifier 102 is connected with the finger capacitor 114, and the positive input terminal of the signal amplifier 102 is connected with a ground terminal. The signal amplifier 102 is configured to output the output voltage from the output terminal of the signal amplifier 102 according to a capacitance value of one of the finger capacitors 114.

In an embodiment, the capacitor 104 may be an inner capacitor of the fingerprint sensor or other capacitors, and the capacitance value of the capacitor 104 is usually fixed.

The switch unit 106 is connected with the rheostat 108 in series, and is configured to control the rheostat 108 to be connected with the capacitor 104 in parallel, such that the output voltage has a non-linear relationship with the capacitance value of one of the finger capacitors 114. In an embodiment, the switch unit 106 includes a first connecting terminal E1 and a second connecting terminal E2, the first connecting terminal E1 is connected with a first terminal of the capacitor 104, the second connecting terminal E2 is connected with a first terminal of the rheostat 108, a second terminal of the rheostat 108 is connected with a second terminal of the capacitor 104.

When the switch unit 106 is turned on, the rheostat 108 is connected with the capacitor 104 in parallel, that is, the first connecting terminal E1 is connected with the second connecting, terminal E2, such that the rheostat 108 is connected with the capacitor 104 in parallel. When the rheostat 108 is connected with the capacitor 104 in parallel, the capacitor 104 discharges to the rheostat 108, and thus the voltage of the capacitor 104 drops.

When the switch unit 106 is turned off, the rheostat 108 is disconnected from the discharging loop of the capacitor 104. That is, the first connecting terminal E1 is disconnected from the second connecting terminal E2, such that the rheostat 108 and the capacitor 104 cannot form the discharge loop.

In an embodiment, as shown in FIG. 1, the sampling hold circuit 110 is connected between the output terminal of the signal amplifier 102 and a terminal of the analog-to-digital converter 112. The sampling hold circuit 110 is configured to amplify the output voltage from the output terminal of the signal amplifier 102 by a predetermined factor. The analog-to-digital converter 112 is configured to convert an amplified output voltage to a numerical value and save the numerical value. The fingerprint detection circuit 100 may further include a digital signal processor (not shown) for processing digital signals, and the digital signal processor is connected with the output terminal of the analog-to-digital converter 112. The digitized voltages outputted from the signal amplifier 102 are convenient for following computation.

In an embodiment, the capacitance value of one of the finger capacitors is determined according to a formula of $$Vo=(Vs-Vt*Cx/Ci).$$

where, Vo is the output voltage, Vt is an excitation voltage of the excitation signal, Cx is the capacitance value of one of the finger capacitors 114. Ci is a capacitance value of the capacitor 104, Vs is a voltage drop amplitude of the capacitor 104 and Vs=Vt*Cx*Ts/(Ci*Ci*Rs), Rs is a resistance value of the rheostat 108, and Ts is a detection time. Thus, the output voltage Vo of the signal amplifier 102 has the non-linear relationship with the capacitance value Cx of one of the finger capacitors 114.

When the fingerprint detection circuit 100 is working, the switch unit 106 is turned on, the capacitor 104 is not charged, two terminals of the finger capacitor 114 are connected with the ground when the finger capacitor 114 is initialized, and the signal generator 116 is connected to the ground (i.e. Vt is connected to the ground). At this time, the output voltage Vo from the output terminal of the signal amplifier 102 is equal to 0.

When the fingerprint detection circuit 100 collects the fingerprints, the signal generator 116 increases the excitation voltage and during the increasing of the excitation voltage Vt, the finger capacitor 114 is charged, where the electric quantity of charges is Q=Vt*Cx. Due to the virtual short and the virtual off feature principles of the operational amplifier, the voltage outputted from the signal amplifier 102 will decrease, and the capacitor 104 is needed to charge with the same amount of charges. At this time, the electric quantity of charges is Q=(0−Vo)*Ci=Vt*Cx, and thus the output voltage Vo=−Vt*Cx/Ci. The voltage of the capacitor 104 is −Vo, that is, a voltage at the left terminal (which is connected with the negative input terminal of the signal amplifier 102) of the capacitor 104 is 0, a voltage at the right terminal (which is connected with the positive input terminal of the signal amplifier 102) of the capacitor 104 is −Vo, and the rheostat 108 in parallel with the capacitor 104 may be discharged, the current I=−Vo/Rs, (minus sign indicates the direction, the current flows from the left side (which is connected with the negative input terminal of the signal amplifier 102) to the right side (which is connected with the positive input terminal of the signal amplifier 102)). After the short time Ts (with the discharge process of the rheostat 108, the absolute value of the output voltage Vo will drop, the current will become smaller, but when the time is too short, the drop of the voltage is not too much, so here is an approximation), the discharge electricity Qs=I*Ts, due to the discharge voltage all from the capacitor 104, the voltage of the capacitor 104 will drop, the drop range Vs=Qs/Ci, so the final output voltage Vo=−Vt*Cx/Ci−(−Vs)=Vs−Vt*Cx/Ci. The output voltage is amplified for 10 times by the sampling hold circuit 110, the final detection voltage to the analog-to-digital converter 112 is Va=n*(Vs−Vt*Cx/Ci), and Vs=Qs/Ci=I*Ts/Ci=Vo/Rs*Ts/Ci=Vt*Cx*Ts/(Ci*Ci*Rs), where the detection time Ts is a fixed value, the detection time for example, Ts=2.5 ms, can be predetermined in the fingerprint detection circuit, and the detection time Ts is less than the period of the excitation signal, Rs is the resistance value of the rheostat 108, that is, the effective value connected into the discharge loop of the capacitor 104. Therefore, the voltage drop range Vs of the capacitor 104 is controlled by adjusting the resistance value of the rheostat 108, and then the output voltage Vo from the output terminal of the signal amplifier 102 is controlled.

For example, when the finger 500 is put on the fingerprint sensor 502, in a conventional detection, the first voltage corresponding to the ridge capacitor Vo1=−2V, and assume that the second voltage corresponding to the valley capacitor is 15% less than the first voltage, the second voltage Vo2=−1.7V. If the input range of the AD converter 112 is 0~−5V, then the sampling hold circuit 110 may amplify the first voltage and the second voltage by at most 2.5 times, i.e., the amplified first voltage Va1=−5V, the amplified second voltage Va2=−4.25V and the difference Va1−Va2=−0.75V.

In an embodiment, when the fingerprint detection circuit 100 is used to collect fingerprint, and the initialized voltage over the capacitor 104 is assumed to be Vs=1.5V, then during detection, the first voltage Vo1=1.5−2=−0.5V, and the second voltage Vo2=1.5−1.7=−0.2V. At this time, the sampling hold circuit 110 may amplify the first voltage Vo1 and the second voltage Vo2 for 10 times, i.e., the amplified first voltage Va1=−5V, the amplified second voltage Va2=−2V, and the difference Va1−Va2=−3V, which is −3/−0.75=4 times greater than the above difference in the conventional detection. The second voltage Vo2 is 60% less than the first voltage Vo1, which is 4 times greater than in the conventional detection. Then, the difference between the amplified first voltage Va1 and the amplified second voltage Va2 is relatively large, and the signal to noise ratio is higher, which is more easily for the subsequent algorithms to recognize.

Therefore, taking the first voltage as an example, it can be determined whether the first voltage Vo1 is larger than or equal to −0.5V (the predetermined value) and, if yes, the first voltage Vo1 is used to generate the fingerprint image. If no, the fingerprint detection circuit 100 can adjust at least one of the excitation voltage Vt and the resistance value of the rheostat 108 so as to adjust the first voltage Vo1. The predetermined value setting can be considered with the factors such as the range of the AD converter 112, the security range of the excitation voltage Vt and a adjusting range of the resistance value of the rheostat 108.

With the fingerprint detection circuit 100 according to embodiments of the present disclosure, the output voltage Vo of the signal amplifier 102 has a non-linear relationship with the capacitance value of one of the finger capacitors 114, in the subsequent process, the output voltage of the signal amplifier 102 can be amplified in a locally linear, such that the difference between the voltage corresponding to the ridge capacitor and the voltage corresponding to the valley capacitor becomes relatively large, and the signal to the noise ratio is higher, which is more easily for the subsequent algorithms to recognize, thus improving the effect of the fingerprint detection.

Figure 3:
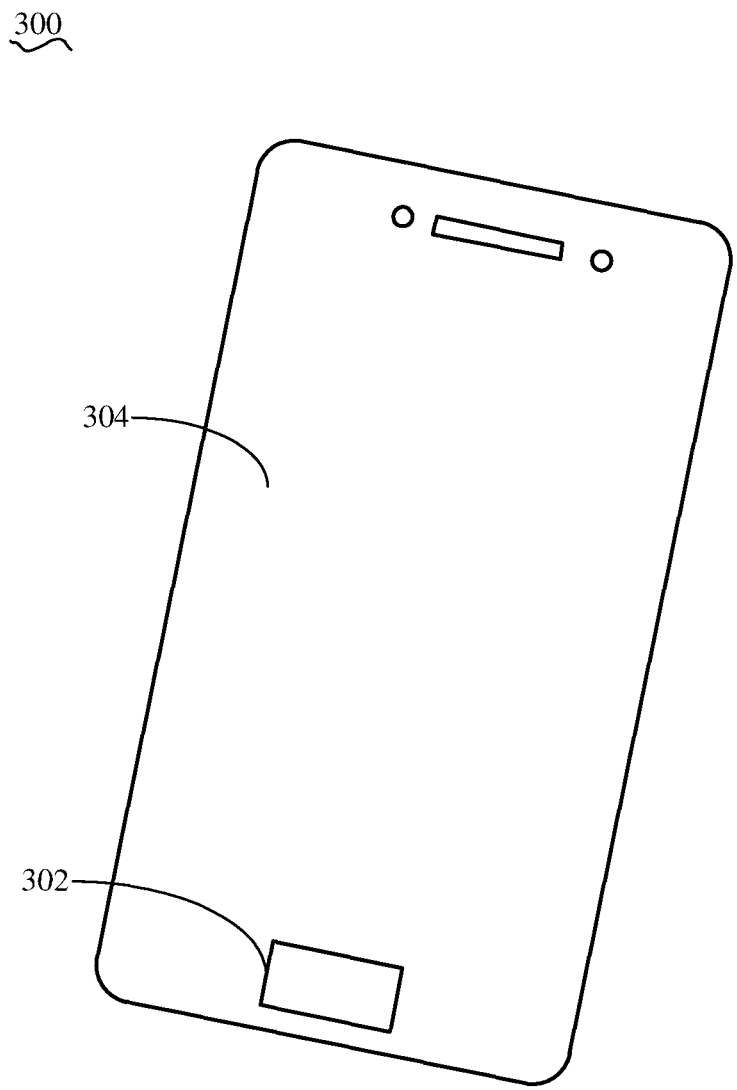
FIG. 3 is a schematic diagram of an electronic device according to an embodiment of the present disclosure.

FIG. 3 is a schematic diagram of an electronic device according to an embodiment of the present disclosure. As shown in FIG. 3, the electronic device 300 includes a fingerprint detection circuit. The fingerprint detection circuit may be configured inside the electronic device 300. The fingerprint detection circuit may be any one of the above fingerprint detection circuits in the above embodiments.

With the electronic device according to embodiments of the present disclosure, the output voltage of the signal amplifier has a non-linear relationship with the capacitance value of one of the finger capacitors, in the subsequent process, the output voltage of the signal amplifier can be amplified in a locally linear, such that the difference between the voltage corresponding to the ridge capacitor and the voltage corresponding to the valley capacitor becomes relatively large, and the signal to noise ratio is higher, which is easier for the subsequent algorithms to recognize, thus improving the effect of the fingerprint detection.

In an embodiment, the electronic device 300 may be a mobile phone. It can be understood that, in other embodiments, the electronic device 300 may also be a tablet PC, a notebook computer, an intelligent wearable device, an audio player, a video player, or any, other electronic, device having a fingerprint detection requirement.

In an embodiment, the electronic device 300 includes a fingerprint sensor 502. The fingerprint sensor 502 is connected with the fingerprint detection circuit 100, and is configured to generate the finger capacitors 114 with the finger 500.

A collecting window 302 of the fingerprint sensor 502 may be deposed on a front panel 304 of the electronic device 300, and thus it is easy for collecting the fingerprints of the uses. The collecting window 302 may be at other locations of the electronic device 300, such as at a side surface or at a back surface of the electronic device 300.

Accordingly, the electronic device 300 may have an improved fingerprint detection effect.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete tonic circuit having a logic gate circuit for realizing a logic function of a data signal, an application-specific integrated circuit having an appropriate combination logic gate circuit, a programmable gate array (PGA) a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. It Should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

What is claimed is:

1. A fingerprint detection circuit, configured to apply an excitation signal to a finger so as to generate finger capacitors, the fingerprint detection circuit comprising:
   a signal amplifier having a negative input terminal connected with one of the finger capacitors, a positive input terminal connected with a ground terminal, and an output terminal to output an output voltage according to a capacitance value of the one of the finger capacitors;
   a capacitor connected between the negative terminal and the output terminal of the signal amplifier;
   a rheostat;
   a switch unit connected with the rheostat in series, and configured to control the rheostat to be connected with the capacitor in parallel, such that the output voltage has a non-linear relationship with the capacitance value of the one of the finger capacitors;
   a sampling hold circuit connected to the output terminal of the signal amplifier; and
   an analog-to-digital converter connected to a terminal of the sampling hold circuit.

2. The fingerprint detection circuit according to claim 1, wherein the capacitance value of the one of the finger capacitors is determined according to a formula of $$Vo=(Vs-Vt*Cx/Ci),$$

in which, Vo is the output voltage, Vt is an excitation voltage of the excitation signal, Cx is the capacitance value of the one of the finger capacitors, Ci is a capacitance value of the capacitor, Vs is a voltage drop amplitude of the capacitor, Rs is a resistance value of the rheostat, and Ts is a detection time.

3. The fingerprint detection circuit according to claim 1, wherein:
   the switch unit comprises a first connecting terminal and a second connecting terminal;
   the first connecting terminal is connected with a first terminal of the capacitor, the second connecting terminal is connected with a first terminal of the rheostat, and a second terminal of the rheostat is connected with a second terminal of the capacitor;
   when the first connecting terminal is connected with the second connecting terminal, the rheostat is connected with the capacitor in parallel.

4. An electronic device, comprising a fingerprint detection circuit configured to apply an excitation signal to a finger so as to generate finger capacitors;
   wherein the fingerprint detection circuit comprises:

a signal amplifier having a negative input terminal connected with one of the finger capacitors, a positive input terminal connected with a ground terminal, and an output terminal to output an output voltage according to a capacitance value of the one of the finger capacitors;

a capacitor, connected between the negative terminal and the output terminal of the signal amplifier;

a rheostat;

a switch unit connected with the rheostat in series, and configured to control the rheostat to be connected with the capacitor in parallel, such that the output voltage has a non-linear relationship with the capacitance value of the one of the finger capacitors;

a sampling hold circuit connected to the output terminal of the signal amplifier; and an analog-to-digital converter connected to a terminal of the sampling hold circuit.

5. The electronic device according to claim 4, wherein the capacitance value of the one of the finger capacitors is determined according to a formula of $$Vo = (Vs - Vt * Cx/Ci),$$

in which, Vo is the output voltage, Vt is an excitation voltage of the excitation signal, Cx is the capacitance value of the one of the finger capacitors, Ci is a capacitance value of the capacitor, Vs is a voltage drop amplitude of the capacitor, Rs is a resistance value of the rheostat, and Ts is a detection time.

6. The electronic device circuit according to claim 4, wherein:

the switch unit comprises a first connecting terminal and a second connecting terminal;

the first connecting terminal is connected with a first terminal of the capacitor, the second connecting terminal is connected with a first terminal of the rheostat, and a second terminal of the rheostat is connected with a second terminal of the capacitor;

when the first connecting terminal is connected with the second connecting terminal, the rheostat is connected with the capacitor in parallel.

7. The electronic device circuit according to claim 4, further comprising a fingerprint sensor connected with the fingerprint detection circuit, and configured to generate the finger capacitors with the finger.

* * * * *